Feb. 24, 1953 H. G. WEISS 2,629,840

VOLTAGE CONTROL SYSTEM

Filed June 23, 1945 2 SHEETS—SHEET 1

INVENTOR
HERBERT G. WEISS

BY Ralph L. Chappell
ATTORNEY

Feb. 24, 1953 H. G. WEISS 2,629,840

VOLTAGE CONTROL SYSTEM

Filed June 23, 1945 2 SHEETS—SHEET 2

INVENTOR
HERBERT G. WEISS

BY D. B. Ayler
Joseph Weingarten
ATTORNEYS

Patented Feb. 24, 1953 2,629,840

UNITED STATES PATENT OFFICE 2,629,840

VOLTAGE CONTROL SYSTEM

Herbert G. Weiss, Boston, Mass., assignor, by mesne assignments, to the United States of America as represented by the Secretary of the Navy Application June 23, 1945, Serial No. 601,159

14 Claims. (Cl. 315—30)

This invention relates to voltage control devices, and more particularly to an improved system for controlling the gain of a radio receiver or the like.

In systems for the transmission and reception of pulsed radio signals, it is often desirable to have control from a plurality of different sources simultaneously over the intensity of signals present in various components of the system. For example, in a radio receiver for the reception of pulsed signals, it is not enough merely to have manual control over the gain of the receiver. It may be also necessary to be able to introduce automatic volume control and simultaneously be able to set the gain by hand. Further, it is often desirable to be able to raise the gain of the receiver for a short space of time, in order to improve the reception of certain signals occurring during that space of time relative to those not occurring during that space of time. This may be termed "gating" the receiver gain. As another example, it is often necessary in the use of cathode ray tubes as indicators in such systems to be able simultaneously to have all these types of control over the intensity of the presentation provided by the tube.

When a gain control of the usual potentiometer variety is used with a radio receiver, the introduction of automatic volume control or temporary additional gain requires additional circuits and elements that add to the cost and weight of the receiver and to the complexity of its design. The same is true when it is sought to obtain such multiple control of the intensity of the presentation of a cathode ray tube.

It is an object of my invention to provide an electrical circuit for controlling voltage that will respond simultaneously to manual setting, automatic frequency control signals, and intensifying pulses.

It is another object of my invention to provide such a circuit that will control the gain of a radio receiver in response to any or all of the applied signals simultaneously or singly.

It is still another object of my invention to provide such a circuit that will be simple in design, easy to construct, and light in weight.

Other and further objects of my invention will become apparent upon a careful consideration of the following detailed description when taken together with the accompanying drawings, which illustrate typical embodiments and applications of the invention, in which.

Figure 1:
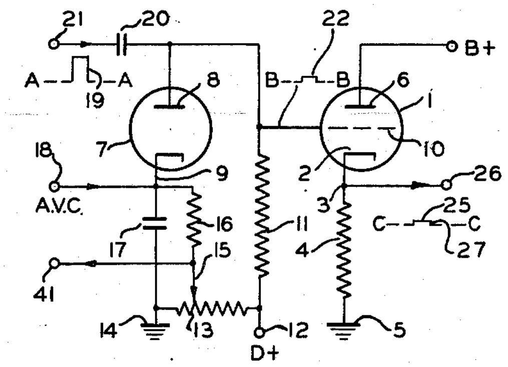
Fig. 1 is a schematic diagram of a circuit constructed in accordance with my invention.

In Fig. 1 an electron tube 1 has its cathode 2 connected at a point 3 to one end of a resistor 4, which resistor preferably has a value of about 25,000 ohms. The resistor 4 is connected at its other end to ground 5. The anode 6 of the tube 1 is connected to a source of unidirectional positive or B+ voltage. This source of voltage may have a value of about 250 volts. A second electron tube 7 having an anode 8 and a cathode 9 is connected at its anode to the grid 10 of the first tube 1. The anode 8 of the second tube 7 and the grid 10 of the first tube 1 are together connected to a resistor 11 at one end thereof. The resistor 11, which preferably has a very high value of resistance, such as about approximately 10 megohms, is connected at its other end to a second source of unidirectional positive voltage D+ at a suitable connection point 12. This second source of voltage D+ may have a value of about 105 volts. A potentiometer 13 is connected from the connection point 12 to ground 14, and the movable tap 15 of the potentiometer 13 is connected to the cathode 9 of the second electron tube 7 through a resistor 16. A capacitor 17 is connected from the cathode 9 of the second tube 7 to ground 14. Automatic volume control signals may be connected to the cathode 9 of the second tube 7 at a suitable connection point 18. Gating pulses of positive voltage 19 may be introduced into the circuit via the anode 8 of the second tube 7 through a capacitor 20 at a connection point 21.

The hereinabove described circuit works as follows in the absence of gating pulses 19 at the point 21 and automatic volume control signals at the appropriate point 18. When the movable tap 15 of the potentiometer 13 is at its extreme left hand (ground) end, the second tube 7 is in a current-conducting state, and current flows from the source D+ (at point 12) through the resistor 11, the second tube 7 and the resistor 16 to ground 14. The voltage level of the cathode 9 is determined by the voltage drop in the resistor 16, and has some positive value that is less than that of the source D+. The voltage present at the anode 8 of the second tube 7 is the same as the potential of the grid 10 of the first tube 1, and this voltage will always have a positive value that will be least when the movable tap 15 of the potentiometer 13 is at the ground end 14 of that potentiometer 13, as will soon become apparent. As the movable tap 15 of the potentiometer 13 is moved to the right toward the connection point 12, a positive voltage of increasing value is applied to the cathode 9 of the second tube 7, which tends to reduce the amount of current flowing in the tube 7 in accordance with well known principles. Since the current flowing in the second tube 7 is the current that flows in the resistor 11 connected between the source D+ and the second tube anode 8, the voltage lost in the resistor 11 will correspondingly diminish, with the result that the voltage present at the second tube anode 8 and at the grid 10 of the first tube 1 will rise. The voltage present at the grid 10 is always that value found by subtracting the voltage lost in the resistor 11 due to current flowing therethrough from the voltage of the second source D+. When the movable tap 15 of the potentiometer 13 has reached the extreme right-hand end, the voltage present at the cathode 9 of the second tube 7 will have reached its maximum positive value and the current flowing through the second tube 7 will be at its smallest value. Correspondingly, the voltage lost in the resistor 11 will be at a minimum, and the voltage present at the grid 10 of the first tube 1 will be at a maximum positive value, which value will approach and may reach the value of the voltage of the source D+. Thus as the movable tap 15 of the potentiometer 13 is moved from the ground end 14 to the high voltage end 12 of the potentiometer 13, the voltage present at the grid 10 will rise toward the value to the source D+. The voltage present at the grid 10 of the first tube 1 follows the voltage present at the cathode 9 of the second tube 7. I have found that the relationship between these two voltages is substantially linear. In the manner hereinabove described the voltage of the grid 10 of the first tube 1 is manually controlled by the setting of the movable tap 15 of the potentiometer 13.

Signals for controlling automatically the amount of output of the circuit of Fig. 1 may be introduced through the cathode 9 of the second tube 7, as hereinabove set forth. The cathode resistor 16 and associated capacitor 17 are provided to permit these automatic control signals to be properly coupled into the circuit. The resistor 16 should be of the proper value to match the output impedance of the automatic control circuit, but should, however, have a value that is very small compared to the value of the grid resistor 11. The reason for this is so that when the second tube 7 is conducting the major portion of the voltage drop in the resistors in its circuit shall appear in the grid resistor 11. Voltage drops that appear in the cathode resistor 16 will not contribute materially to control of the voltage of the grid 10. The resistor 16 has an incidental value as a stabilizing element in the circuit of the second tube 7 in that it provides positive cathode biasing when the tube 7 is conducting, and thus, prevents sudden surges of current through the tube 7. The reason for the inclusion of the capacitor 17 will appear hereinbelow in the discussion of the operation of my invention with positive gating pulses 19.

Automatic control signals such as those from an automatic volume control circuit usually consist of a unidirectional voltage that varies in intensity under certain self-control as desired. This unidirectional voltage applied to the cathode 9 of the second tube 7 effects a variation in the conductivity of the tube 7, and hence in the current flowing in the tube 7. In turn the voltage lost in the resistor 11 will be altered, and correspondingly the voltage present at the grid 10 of the first tube will change. Thus the voltage of the grid 10 of the first tube may be controlled automatically and manually at the same time and through the same electron tube 7. When the automatic voltage control signal has a higher positive value than the voltage already present at the cathode 9, that signal will take control. Otherwise, the manually regulated voltage at the cathode 9 will be controlling.

Figure 3:
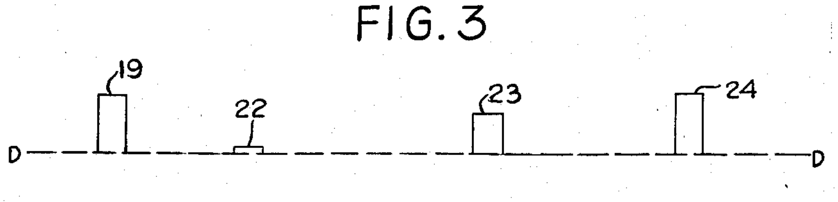
Fig. 3 illustrates the action of the circuits of Fig. 1 and Fig. 2 in controlling the intensity of a positive gating pulse.

Gated control of the output of the circuit of Fig. 1 may be had by introducing a positive gate pulse 19 at the anode 8 of the second tube 7 through a coupling capacitor 20. Connection is made at a suitable point 21, all as hereinabove set forth. A positive gating pulse 19 is illustrated on a base line A—A which represents the zero voltage level. The lines B—B and C—C also represent the zero voltage level and are used only for comparing the various pulse amplitudes throughout the circuit with each other. Lines B—B and C—C do not represent the D. C. voltage level present at the grid 10 or the point 3. Positive pulse voltages are represented above a line A—A, B—B, or C—C. The positive pulse 19 is the input pulse. If the second tube 7 is in a current conducting state, the pulse 19 will be clipped, or partly rectified at the anode 8, with the result that at least some of the voltage of the pulse 19 is lost in the tube 7. From another aspect, it may be said that the positive pulse 19 causes the anode 8 of the tube 7 to rise in voltage, thereby causing the tube 7 to have increased conductivity. In turn the increased current that results causes a larger voltage drop in the grid resistor 11, which voltage drop is opposite in sense to the said rise at the anode 8. These two opposing effects result in a pulse 22 on the grid 10 that is of lesser positive voltage than the input pulse, 19, as shown on a zero voltage line B—B. The pulse 19 has in effect been dropped to a lower voltage value. In a similar manner to the control it exerts over the voltage normally present at the grid 10, the movable tap 15 of the potentiometer 13 controls the positive voltage value of the pulse that will appear on the grid 10. Thus, if the movable tap 15 is at the extreme right hand position and the second tube 7 is in a non-conducting state, a positive pulse 19 impressed upon the anode 7 will proceed to the grid 10 undiminished in voltage. In Fig. 3 is illustrated the action of the tube 7 and the potentiometer 13 in controlling the intensity of the pulse present at the grid 10. The input pulse 19 is shown on a line D—D, which represents the zero voltage level. The pulses 22, 23, and 24 represent the approximate proportional voltages of the pulses that will be found at the grid 10 for three different settings of the movable tap 15 of the potentiometer 13. A small pulse 22 is had when the cathode 9 is at a small positive value corresponding to the movable tap 15 being near the left hand end of the potentiometer 13.

A highly positive pulse 24 is had when the cathode 9 is at a highly positive value, as when the movable tap 15 is near the right hand end of the potentiometer 13, near the connection point 12. An intermediate pulse 23 is had when the movable tap 15 is in an intermediate position. The pulse that will be found at the grid 10 is seen thus to have a positive value that follows the value of voltage on the cathode 9 of the second tube 7. This relationship also is substantially linear.

Thus it is seen that the circuit of Fig. 1 provides manual, automatic, and pulsed control of a voltage, as that applied to the grid 10. If the circuit conditions are such that the grid 10 is already somewhat positive when a positive pulse 19 comes along, the pulse 22, 23, or 24 that is applied to the grid 10 will be added in a parallel electrical manner to the voltage already there. The reason for this is that the pulse 19 is applied to the anode 8 in parallel with the voltage from the source D+, so that the higher voltage becomes the anode voltage at any one instant.

The capacitor 17 is included in the circuit to remove from the resistor 16 any alternating voltages that may be present therein due to the application of pulses 19 to the circuit. Alternating voltages in the resistor 16 would be injurious to the action of automatic volume control signals introduced at the point 18.

The grid 10 controls the current flowing in the first tube 1, which is in a cathode follower circuit. A cathode follower circuit has an amplification factor of 1 or less, and is by its very nature stable. Since I have provided against the introduction of instability through the control grid 10 during the variation of the potential thereof, I have made it possible to control very accurately the output of a cathode follower circuit, for the output of this circuit depends on the potential of the control grid 10. As this potential rises, current flows from the anode 6 of the first tube 1 to the cathode 2 through the tube 1 and through the resistor 4 to ground 5. As hereinabove stated, the anode 6 is at all times at a higher positive potential than the grid 10, thus minimizing the possibility that there will be grid current. The voltage drop across the resistor 4 due to current flowing therein is the output of the cathode follower circuit. This current being controlled by the potential on the grid 10, the output of the circuit is also controlled by that grid potential. With the voltage B+ about 250 volts as an example and the resistor 4 being chosen to have about the same value as the direct current resistance of the tube 1, then there will be about 125 volts positive at the point 3, variable and controllable in magnitude by movement of the arm 15 of the potentiometer 13, and also by control signals introduced at point 18 and by pulses 19 introduced at point 21. The pulse 22 on the grid 10 will appear as a pulse 25, shown on a zero voltage line C—C, in the resistor 4. The pulse 25 will be very similar to the pulse 22 on the grid 10. It is to be understood that the pulse 25 will be added in parallel to any voltage already in the resistor 4, and that the zero voltage reference line C—C does not represent the D. C. voltage present in the resistor 4. The pulse 25 may appear in the resistor 4 even though the circuit of Fig. 1 be adjusted manually to provide zero voltage at the grid 10 as a normal condition. The output of the circuit of Fig. 1 is taken off at a suitable point 26.

Figure 2:
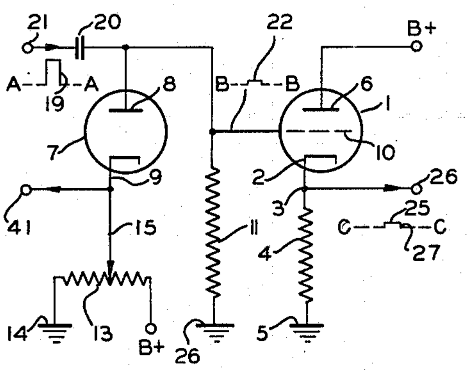
Fig. 2 is another schematic diagram of a second circuit constructed in accordance with my invention.

Fig. 2 illustrates an embodiment of my invention in which manual and automatic setting of the voltage on the grid 10 are not included as features. The second tube 7 performs the sole function of controlling the output amplitude of a positive pulse applied to the anode 8. The circuit of Fig. 2 has the resistor 11 connected to ground 26 at one end and to the grid 10 at the other. The potentiometer 13 is connected from B+ to ground, and supplies a variable positive voltage to the cathode 9 through the movable tap 15. When the tap 15 is at the extreme left-hand, or ground end of the potentiometer 13, the cathode 9 and the anode 8 of the second tube 7 are both at ground potential. No current flows in the grid resistor 11, and since no voltage is applied to the resistor 13, the grid 10 is also at ground potential. If the tap 15 is now moved toward the right, to the B+ end of the potentiometer 13, the cathode 9 will have an increasingly positive voltage applied to it. This will not cause or of itself permit current to flow in the second tube 7. Therefore, there will be no change in the voltage at the anode 8 or the grid 10 for any position of the tap 15.

However, when a positive pulse 19 is applied to the circuit at the point 21, and brought to the anode 8 through the coupling condenser 20, the potentiometer 13 will be effective to control the positive voltage level of the pulse 22 at the grid 10. When the tap 15 is at the ground end of the potentiometer 13, the anode 8 and the cathode 9 of the second tube 7 are both at the same ground potential, as hereinabove stated. The positive pulse 19 raises the voltage at the anode 8, and causes the tube 7 to conduct current, when a certain positive voltage level greater than the cathode voltage is reached. For a value of the voltage of the pulse 19 above this certain value, the tube 7, being conductive, acts as a short circuit for the pulse 19, thereby clipping the pulse. Simultaneously there is a voltage drop in the resistor 11 due to the current that flows therein when the voltage of the clipped pulse 19 is applied thereto. The direction of this current flow is from the anode 8 to ground 26, and the voltage developed in the resistor 11 is therefore a positive pulse voltage 22 shown on the reference line B—B. This pulse 22 is the result of the clipping of the pulse 19 to a lower positive value. As the tap 15 is moved toward the B+ end of the potentiometer 13, the voltage at the cathode 9 rises, and the anode voltage required to render the tube 7 conducting in the presence of the positive pulse 19 becomes correspondingly greater, in accordance with well known principles. As a consequence, the amount of current that will flow in the resistor 11 becomes greater. The voltage at the grid 10 then also becomes greater, and that the amount by which the pulse 19 is diminished is less. Thus, the pulse 22 has an increasingly positive value as the tap 15 is moved toward the right hand or B+ end of the potentiometer 13.

The circuit of Fig. 2 might be called a variable pulse clipper. Its action is similar to the corresponding action of the circuit of Fig. 1 and is represented in the same manner in Fig. 3. In Fig. 3, the pulse 22 represents the pulse present at the grid 10 when the tap 15 is near the ground end of the potentiometer 13. The pulse 24 represents the pulse present at the grid 10 when the tap 15 is near the B+ end of the potentiometer 13. The pulse 23, again, represents the pulse at the grid 10 for an intermediate setting of the tap 15. The arrangement of the tube 1 and its circuit elements is the same in Fig. 2 as in Fig. 1, and functions in the same manner, namely as a cathode follower output stage for the voltage control circuit.

In the circuit of the tube 1, the cathode resistor 4 is not of a critical value. If the output of the tube 1 is to be connected to a device that has the proper input impedance for developing therein the output voltage of the tube 1, the resistor 4 may be omitted. However, it is preferred that a resistor 4 be included in the circuit of the tube 1, as the output pulse 25 will thereby be made to have a substantially vertical trailing edge 27.

Although there are many valuable and novel uses for my invention as hereinabove described and illustrated I have chosen but two as examples.

Figure 4:
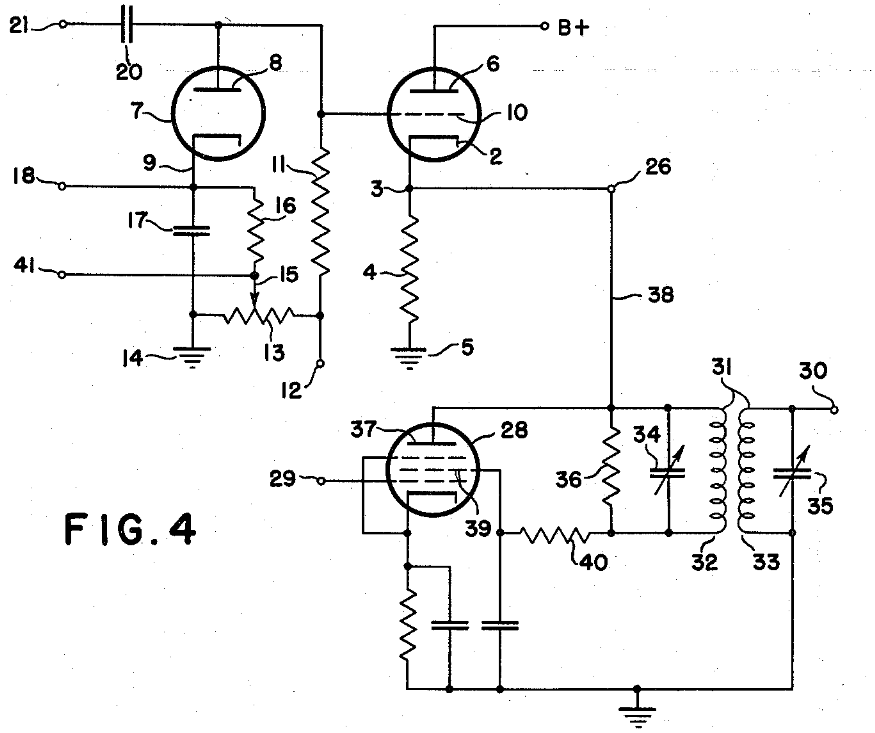
Fig. 4 illustrates a manner in which my invention may be used to control the gain of an amplifier.
Figure 5:
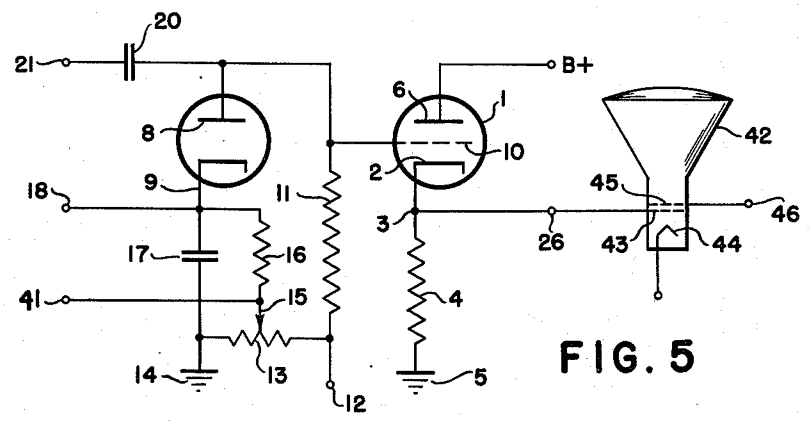
Fig. 5 illustrates a manner in which my invention may be used in combination with a cathode ray tube to control the intensity of presentation.

These examples are shown in Figs. 4 and 5. In both examples the circuit of Fig. 1 is employed as the voltage control circuit.

In Fig. 4 is shown a transformer coupled amplifier, of a common type used for amplification in the intermediate frequency stages of a superheterodyne receiver, which may use the output of my voltage control circuit to great advantage. A conventional transformer coupled amplifier is shown having an electron tube 28. The signal to be amplified is introduced at a connection point 29 and the amplified signal removed at another connection point 30. The interstage coupling transformer 31 is made up of a primary coil 32 and a secondary coil 33, and has two tuning capacitors 34 and 35, both variable. The resistor 36 is a damping resistor. Anode voltage is supplied from the output of my cathode follower circuit at point 26 to the anode 37 of the tube 28 through a wire 38. The same source of voltage may be used to supply screen grid voltage to the screen grid 39, the resistor 40 being introduced to reduce the screen grid voltage to a proper value. It is to be noted that as the output of the cathode follower circuit is varied in voltage, no change occurs in the value of resistor 4 or any other circuit element involved in the amplifier circuit. By replacing the usual B+ and the screen grid supply of the amplifier with my voltage control circuit, I have provided a gain control for an amplifier that will furnish manual gain control, automatic volume control, and pulse-intensified gain, all simultaneously or singly, as desired.

It may be desired to control the gain of a multi-stage amplifier with my circuit. To accomplish this, it is only necessary that similar connections be made from the output point 26 to the anode and screen grid, or the anode alone, if desired, of each electron tube sought to be controlled. If desired, the output at point 26 may be connected to only a few stages. A further variation is possible by making use of the voltage taken directly from the potentiometer 13 at the point 41. Thus, with the circuit of Fig. 1 or of Fig. 2, controlled pulses may be applied from the output point 26 to one or more stages of a multi-stage amplifier, while the gain of other stages is regulated by the potentiometer 13 through the point 41, the point 41 being connected to the anodes and/or screen grids of the other stages, as desired.

In Fig. 5 is illustrated another novel use for the circuits of my invention. Here a cathode ray tube 42, having a cathode 44, has an intensity-control grid 43 connected to the output point 26 of the tube 1. By this simple connection, my invention may be used to control the brightness of the cathode ray tube picture automatically or manually, and to blank or unblank the picture as desired. With the circuit of Fig. 5, a second grid 45 may be connected at a point 46 to the potentiometer 13 at the point 41, so that separate intensity control and unblanking may be had. This will permit manual adjustment of the basic intensity, while the output pulse 25 is used to illuminate the picture when desired. If desired, the cathode follower stage including the first tube 1 may be omitted and connection made from the grid 10 directly to the grid 43. Impedance matching considerations will determine the desirability of doing this.

Although I have shown and described only certain specific embodiments of my invention, I am fully aware of the many modifications possible thereof. The values of circuit elements and voltages hereinabove mentioned are by way of example only, and are not to be regarded as the only values usable. Nor is it intended that my voltage control circuit be used as a gain control for a transformer coupled amplifier only, but rather it is contemplated that this circuit may be used with any kind of amplifier of any number of stages, and indeed with other devices than those illustrated. Therefore this invention is not to be limited except insofar as is necessitated by the prior art and the spirit of the appended claims.

I claim:

1. An electrical circuit for producing a variable unidirectional voltage comprising a first electron tube having a cathode, a grid, and an anode, said anode being connected to a first source of unidirectional positive voltage, said grid being connected through a first resistor to a second source of unidirectional positive voltage of substantially smaller magnitude than the voltage of said first source, and said cathode being connected through a second resistor to ground, and a second electron tube having an anode and a cathode, said second tube anode being directly connected to said grid, and said second tube cathode being connected through a potentiometer to said second source of unidirectional voltage in such fashion that the voltage on said second tube cathode may be varied manually through a range of magnitudes at all times equal to or less than the magnitude of the voltage of said second source, whereby when said voltage on said second tube cathode is varied said second tube undergoes a variation in anode voltage and controls directly the voltage of said grid and the magnitude of the current flowing in said first tube and in said second resistor, said first tube being at all times in a current-conducting state.

2. The apparatus of claim 1 in combination with a third source of pulsed positive voltage waves, said pulsed voltage waves being applied to the anode of said second tube and being clipped at a voltage level determined by the voltage at said second tube cathode, the resulting clipped pulsed waves being added in parallel to the voltage on said grid of said first tube.

3. The apparatus of claim 1 in combination with a third source of self-variable unidirectional voltage, said self-variable voltage being applied to said second tube cathode in parallel with said manually variable voltage from said second source, the voltage at said second tube cathode being determined by the higher of the two parallel voltages applied thereto.

4. The apparatus of claim 1 in combination with an amplifier having a third electron tube including an anode, said third tube anode being connected to said first tube cathode at the point of junction with said second resistor, whereby the voltage across said second resistor is the anode supply for said amplifier and the gain of said amplifier is controlled and regulated by said electrical circuit.

5. The apparatus of claim 1 in combination with a cathode ray tube having at least one intensity controlling grid, said grid being connected to said first tube cathode at the point of junction with said second resistor, whereby the voltage across said second resistor is the intensity controlling voltage for said cathode ray tube and the intensity of the presentation of said cathode ray tube is controlled by said electrical circuit.

6. In an electrical circuit, in combination, an electron tube having an anode and a cathode, a first source of positive voltage pulses, means for applying said pulses to said anode, a second source of voltage for said cathode, said second source being at one side connected to ground, manually controlled means for applying the said second source voltage in a variable magnitude to said cathode, a third source of self-variable unidirectional voltage, means for applying said third source voltage to said cathode in parallel with said second source voltage, the anode voltage at which said tube will conduct being determined by the higher positive voltage of the two parallel voltages applied to the cathode thereof, whereby positive pulses applied to said anode cause conduction of said tube to clip said pulses at a pulse voltage level determined by said cathode voltage.

7. The apparatus of claim 6 in combination with a cathode follower output circuit comprising, a second electron tube having a grid, said anode being connected to said grid, and a resistor, said resistor being connected at one end to the common junction of said anode and said grid and at the other end effectively to ground, whereby the voltage at said anode appears on said grid and controls the output of said cathode follower circuit.

8. In an electrical circuit, in combination, an electron tube having an anode and a cathode, a first source of positive voltage pulses, means for applying said pulses to said anode, a second source of voltage for said cathode, said second source being at one side connected to ground, manually controlled means for applying said second source voltage in variable magnitude to said cathode, the cathode voltage being determinant of the anode voltage at which said tube will conduct, and a cathode follower output circuit comprising, a second electron tube having a grid, said anode being connected to said grid, and a resistor, said resistor being connected at one end to the common junction of said anode and said grid, and at the other end effectively to ground, whereby when said positive pulses are applied to said anode, said first tube commences to conduct and clip said pulses at a pulse voltage level determined by said cathode voltage, and the voltage at said anode appears on said grid and controls the output of said cathode follower circuit.

9. Multiple voltage control apparatus comprising, a utilization circuit, a first electron tube having at least an anode, a cathode and a grid and means in circuit with said first electron tube grid for determining the level of voltages applied thereto, said means including a second electron tube having at least a cathode and an anode, means for applying a manually variable voltage to the cathode of said second electron tube, means for applying a self-variable voltage to the cathode of said second electron tube, means for applying a pulsed voltage to the anode of said second electron tube, said second electron tube providing a voltage to the grid of said first electron tube which varies in magnitude with the higher instantaneous voltage of said manually variable voltage and said self-variable voltage and the instantaneous magnitude of said pulsed voltage, and means for applying the output voltage of said first electron tube to said utilization circuit.

10. In combination with a utilization circuit, means for providing a controlled voltage thereto comprising, a cathode follower circuit including a directly energized anode, a cathode having an output terminal connected thereto, and a grid, a source of positive voltage, a resistor connected between said source of positive voltage and said grid, a diode having its anode connected to said grid, a potentiometer connected between said source of positive voltage and ground for providing manually variable voltage to the cathode of said diode from said potentiometer, a source of self-variable unidirectional voltage also connected to the cathode of said diode, a source of pulsed voltage connected to the anode of said diode, and means connecting said output terminal to said utilization circuit, whereby said output terminal provides a voltage to said utilization circuit which varies in magnitude with the higher instantaneous voltage of said manually variable voltage and said self-variable unidirectional voltage and the instantaneous magnitude of said pulsed voltage.

11. Apparatus as in claim 10 wherein said utilization circuit comprises, a cathode ray tube having an intensity controlling grid, said intensity controlling grid being connected to said output terminal, said output terminal providing intensity controlling voltage to said cathode ray tube.

12. Cathode ray tube intensity controlling apparatus comprising, a diode, a potentiometer having a movable tap, a direct current voltage source, said voltage source being connected across said potentiometer, the cathode of said diode being connected to said movable tap on said potentiometer, a triode having input and output circuits, the anode of said diode being connected to said triode input circuit, a cathode ray tube having an intensity controlling grid, the output circuit of said triode being connected to said intensity controlling grid.

13. Apparatus for controlling the intensity of a cathode ray tube having an intensity controlling grid comprising, a diode, a potentiometer having a movable tap, a direct current voltage source, said voltage source being connected across said potentiometer, the cathode of said diode being connected to said movable tap, a first resistor connected to an anode of said diode, a triode having grid and cathode circuits, said first resistor and the anode of said diode being connected to the grid circuit of said triode, said first resistor connecting said triode grid circuit to ground, a second resistor connected from the cathode of said triode to ground, the output of said triode being taken from said cathode and applied to said intensity controlling grid.

14. In combination with a utilization circuit, means for providing a controlled voltage thereto comprising, a first electron tube having an anode and a cathode, a first source of positive voltage pulses, means for applying said pulses to said anode, a second source of voltage for said cathode, said second source being at one side connected to ground, manually controlled means for applying said second source voltage in variable magnitude to said cathode, the voltage at said cathode being determinant of the anode voltage at which said tube will conduct, and a cathode follower output circuit comprising, a second electron tube having at least a grid and a cathode, the anode of said first electron tube being connected to the grid of said second electron tube, a first resistor, said first resistor being connected at one end to the common junction of the anode of said first electron tube and the grid of said second electron tube and at the other end effectively to ground, a second resistor connected from the cathode of said second electron tube to ground, and means connecting the cathode of said second electron tube to said utilization circuit, whereby when said positive pulses are applied to the anode of said first electron tube said first tube controls the level of said pulses applied to said cathode follower circuit and the output of said cathode follower circuit applied to said utilization circuits.

HERBERT G. WEISS.

REFERENCES CITED

The following references are of record in the file of this patent:

UNITED STATES PATENTS

| Number | Name | Date |
|---|---|---|
| 2,059,004 | Leeds | Oct. 27, 1936 |
| 2,144,995 | Pulvari-Pulvermacher | Jan. 24, 1939 |
| 2,209,330 | Haffcke | July 30, 1940 |
| 2,227,050 | White | Dec. 31, 1940 |
| 2,230,926 | Bingley | Feb. 4, 1941 |
| 2,247,324 | Travis | June 24, 1941 |
| 2,383,420 | Scoles | Aug. 21, 1945 |
| 2,420,374 | Houghton | May 13, 1947 |
| 2,453,711 | Isbister | Nov. 16, 1948 |